US010636029B2

(12) United States Patent
Greene et al.

(10) Patent No.: US 10,636,029 B2
(45) Date of Patent: Apr. 28, 2020

(54) SYSTEM FOR PRIORITY PRESENTATION INTEGRATION ON THIRD PARTY SYSTEMS FOR LIMITING RESOURCE DISBURSEMENT

(71) Applicant: BANK OF AMERICA CORPORATION, Charlotte, NC (US)

(72) Inventors: Tracy Beth Greene, Mooresville, NC (US); William Bradley Burks, Charlotte, NC (US); Andrew S. Heiman, Nashville, TN (US); Richard Huw Thomas, Charlotte, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 179 days.

(21) Appl. No.: 15/376,179

(22) Filed: Dec. 12, 2016

(65) Prior Publication Data

US 2018/0137500 A1 May 17, 2018

Related U.S. Application Data

(60) Provisional application No. 62/421,487, filed on Nov. 14, 2016.

(51) Int. Cl.
G06Q 20/36 (2012.01)
G06Q 30/02 (2012.01)
G06Q 20/38 (2012.01)
G06Q 20/32 (2012.01)

(52) U.S. Cl.
CPC ....... *G06Q 20/363* (2013.01); *G06Q 20/3221* (2013.01); *G06Q 20/387* (2013.01); *G06Q 30/0222* (2013.01)

(58) Field of Classification Search
USPC .................. 707/E17.108; 705/7.29; 718/104
See application file for complete search history.

(56) References Cited

U.S. PATENT DOCUMENTS

| 8,091,088 | B2 * | 1/2012 | Kishan ................... G06F 9/485 718/104 |
| 9,483,769 | B2 * | 11/2016 | Rajan ................. G06Q 30/0225 |
| 2005/0108096 | A1 | 5/2005 | Burger et al. |
| 2007/0255652 | A1 | 11/2007 | Tumminaro et al. |
| 2008/0040261 | A1 | 2/2008 | Nix et al. |
| 2009/0248483 | A1 | 10/2009 | Kiefer |
| 2010/0010964 | A1 * | 1/2010 | Skowronek ............ G06Q 30/02 707/E17.108 |
| 2010/0076833 | A1 | 3/2010 | Nelsen |
| 2011/0004546 | A1 | 1/2011 | Thomas |

(Continued)

*Primary Examiner* — Saba Dagnew
(74) *Attorney, Agent, or Firm* — Michael A. Springs; Moore & Van Allen PLLC; Nicholas C. Russell (57) ABSTRACT

Embodiments of the invention are directed to systems, methods and computer program products for implementing logic code within a resource disbursement limiter for integration into user mobile wallets via a third party mobile wallet system. The system provides a logic code within the presented resource disbursement limiter to the third party mobile wallet system for specific integration into a select user's mobile wallets and at selected locations within a list presented to the user via the mobile wallet. Furthermore, the system receives notification of use of the resource disbursement limiter and is pushed the acceptance for integration into the user resource storage.

20 Claims, 8 Drawing Sheets

(56) References Cited

U.S. PATENT DOCUMENTS

| | | |
|---|---|---|
| 2011/0208656 A1 | 8/2011 | Alba et al. |
| 2011/0246298 A1 | 10/2011 | Williams et al. |
| 2012/0101881 A1 | 4/2012 | Taylor et al. |
| 2012/0123924 A1 | 5/2012 | Rose et al. |
| 2012/0130853 A1 | 5/2012 | Petri et al. |
| 2012/0150611 A1 | 6/2012 | Isaacson et al. |
| 2012/0150729 A1 | 6/2012 | Isaacson et al. |
| 2012/0150743 A1 | 6/2012 | Isaacson et al. |
| 2012/0203697 A1 | 8/2012 | Morgan et al. |
| 2012/0271697 A1 | 10/2012 | Gilman et al. |
| 2013/0024371 A1 | 1/2013 | Hariramani et al. |
| 2013/0054336 A1 | 2/2013 | Graylin |
| 2013/0073377 A1 | 3/2013 | Heath |
| 2013/0110604 A1 | 5/2013 | Rooke et al. |
| 2013/0173336 A1* | 7/2013 | Evans ................ G06Q 30/0201 705/7.29 |
| 2013/0346302 A1 | 12/2013 | Purves et al. |
| 2014/0074569 A1 | 3/2014 | Francis et al. |
| 2014/0130035 A1 | 5/2014 | Desai et al. |
| 2014/0207545 A1 | 7/2014 | Berman et al. |
| 2016/0092902 A1 | 3/2016 | Storry |
| 2016/0350789 A1 | 12/2016 | Joglekar et al. |

* cited by examiner

SYSTEM FOR PRIORITY PRESENTATION INTEGRATION ON THIRD PARTY SYSTEMS FOR LIMITING RESOURCE DISBURSEMENT

CROSS-REFERENCE OF RELATED APPLICATIONS

This application claims priority to U.S. Provisional Patent Application Ser. No. 62/421,487, filed Nov. 14, 2016, entitled "System for priority Presentation Integration on Third Party Systems for Limiting Resource Disbursement," the entirety of which is incorporated herein by reference.

BACKGROUND

With advancements in technology, users are able to identify and utilizes limiting resource disbursement items. While entities may target select users for resource disbursement limiters a need exists for the managing, positioning, and backend electronic communication of use of these items in a real-time situation.

BRIEF SUMMARY

The following presents a simplified summary of one or more embodiments of the invention in order to provide a basic understanding of such embodiments. This summary is not an extensive overview of all contemplated embodiments, and is intended to neither identify key or critical elements of all embodiments, nor delineate the scope of any or all embodiments. Its sole purpose is to present some concepts of one or more embodiments in a simplified form as a prelude to the more detailed description that is presented later.

When resource disbursement limiter items such as offers, discounts, promotions, coupons, or the like are presented on a mobile wallet home screen. These items may be positioned in an order for the user to view. The user may be able to see a number of items and can tap the icon associated with the item to open the item. The system integrates logic into the third party mobile wallet system for targeting and positioning of the item first on the ordered view. Alternatively, if there are multiple items from multiple locations, the system ensures with the logic coding that the third party mobile wallet only presents the system associated item.

In some embodiments, the system codes logic within system associated items and integrates the coded logic into third party mobile wallet systems. This integration allows the system to present the system associated items at a location within a mobile wallet home screen on a user device. The system may code for the position it desires the item to be located within the home screen. This may be first on the list, the middle of the list, or the like. The location may be based on an identification of user selection preferences. For example, if the system identifies the user always selects items on the middle of the home screen, the system may integrate code for positioning the system associated items in that location. Furthermore, in some embodiments, the coded logic presented to the third party mobile wallet system via the system associated items may prevent the third party mobile wallet system from presenting other third party items to the user.

In some embodiments, the user may select the item from the mobile wallet home screen and use the offer in conjunction with a transaction. Once selected and used, the logic code embedded within the user's mobile wallet requires one or more of the user device and/or the merchant point of transaction to notify the financial institution associated with the item upon acceptance and use of the item. In this way, the system code may require the communication of acceptance of the item to be pushed to the financial institution for integration into the rewards or programs of the user account instantaneously.

Embodiments of the invention relate to systems, methods, and computer program products for priority presentation integration onto a third party system, the invention comprising: generating a resource disbursement limiter with programmed logic code that is directed to a presentation location within a third party mobile application; transmitting the resource disbursement limiter at the third party system for storage and integration into the third party mobile application for a user; receiving indication of user utilization of the resource disbursement limiter at a merchant location via the third party mobile application; and storing the received indication and compile previously received indications with the user account for additional generation of resource disbursement limiters based on the user utilization of the resource disbursement limiter.

In some embodiments, the resource disbursement limiter is an offer for the user to use during a transaction for purchasing a product or service, within the offer is a discount on a resource requirements for purchasing the product or the service.

In some embodiments, the invention further comprises presenting the resource disbursement limiter as an offer to the user via an interface associated with the third party mobile application during a transaction with a merchant, wherein the offer is positioned in a priority position within a list of offers presented to the user via the interface associated with the third party mobile application.

In some embodiments, the third party mobile application is a mobile wallet application integrated into a user device for use by the user to complete a transaction with one or more accounts.

In some embodiments, the invention further comprises positioning the resource disbursement limiter first on a list of offers provided on an interface associated with a mobile wallet that is provided to the user from the third party for completion of a transaction.

In some embodiments, the invention further comprises positioning the resource disbursement limiter first on a list of offers provided on an interface associated with a mobile wallet based on an identification of a user device accessing the mobile wallet is within a predetermined geographical location.

In some embodiments, receiving an indication of user utilization of the resource disbursement limiter at a merchant location further comprises user selection of an offer via a mobile wallet application provided by the third party to complete a transaction at the merchant using the mobile wallet, wherein the indication is transmitted via a communication link from the merchant or a user device associated with the mobile wallet.

In some embodiments, the resource disbursement limiter is an offer that is generated for the user, wherein the offer is for products or services that are the same or associated with products or services that the user has purchased in the past based on a review of user transaction history.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made to the accompanying drawings, where:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Like numbers refer to elements throughout. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein.

A "transaction" or "resource distribution" refers to any communication between a user and the financial institution or other entity monitoring the user's activities to transfer funds for the purchasing or selling of a product. A transaction may refer to a purchase of goods or services, a return of goods or services, a payment transaction, a credit transaction, or other interaction involving a user's account. In the context of a financial institution, a transaction may refer to one or more of: a sale of goods and/or services, initiating an automated teller machine (ATM) or online banking session, an account balance inquiry, a rewards transfer, an account money transfer or withdrawal, opening a bank application on a user's computer or mobile device, a user accessing their e-wallet, or any other interaction involving the user and/or the user's device that is detectable by the financial institution. A transaction may include one or more of the following: renting, selling, and/or leasing goods and/or services (e.g., groceries, stamps, tickets, DVDs, vending machine items, and the like); making payments to creditors (e.g., paying monthly bills; paying federal, state, and/or local taxes; and the like); sending remittances; loading money onto stored value cards (SVCs) and/or prepaid cards; donating to charities; and/or the like.

As used herein, an offer may include or be referred to as a resource disbursement limiter, an item, a coupon, a discount, or an electronic coupon. In some embodiments, an "entity" may be a financial institution. For the purposes of this invention, a "financial institution" may be defined as any organization, entity, or the like in the business of moving, investing, or lending money, dealing in financial instruments, or providing financial services. This may include commercial banks, thrifts, federal and state savings banks, savings and loan associations, credit unions, investment companies, insurance companies and the like. In some embodiments, the entity may allow a user to establish an account with the entity. An "account" may be the relationship that the user has with the entity. Examples of accounts include a deposit account, such as a transactional account (e.g., a banking account), a savings account, an investment account, a money market account, a time deposit, a demand deposit, a pre-paid account, a credit account, or the like. The account is associated with and/or maintained by the entity. In other embodiments, an entity may not be a financial institution. In still other embodiments, the entity may be the merchant itself. In some embodiments, the "user" may be a customer (e.g., an account holder or a person who has a third party mobile wallet system associated with his/her mobile device.

Embodiments of the invention are directed to systems, methods and computer program products for implementing logic code into an offer for integration into user mobile wallets via a third party mobile wallet system. The technical problem of implementation and utilization of offers on a mobile wallet are twofold. First, the system providing the offer has no ability to control the location of an offer on a mobile wallet screen. Second, the backend processing of the offer from the merchant to the offer provider for any point or reward system is not possible in real or near to real time. As such, the system solves these problems by providing a logic code within the presented offer to the third party mobile wallet system for specific integration of the offer into select user's mobile wallets and at selection locations within a list of offers presented to the user. Furthermore, the system logic code requires the user device to notify the financial institution associated with the offer upon acceptance of the offer, thus pushing the acceptance to the financial institution for integration into the rewards or programs of the user account instantaneously.

As an example, an entity (e.g., a financial institution) may send an offer for a user to a third party mobile wallet system. The offer may be integrated with logic code for presentation to the user via the third party mobile wallet application. In some embodiments, the user may select an option associated with the presented offer to accept the offer. When the user accepts the offer, the offer is activated so that if the user uses an eligible payment method (as determined by the entity or the merchant) to make a purchase associated with the offer, the user receives the benefit associated with the offer. In other embodiments, the offer may be automatically activated if the user has previously chosen to automatically activate offers associated with particular types (e.g., associated with particular merchants or product or service types). In some embodiments, the entity or the merchant may determine that a user may choose among multiple eligible payment methods in order to make a purchase associated with the offer.

As an example, the activated offer may be a rebate of $5 on a purchase of $20 from a department store. The user may decide to use the offer by visiting the department store and making a purchase of $20. In some embodiments, at the point of sale, the user pays $20 for the user's purchase using the mobile wallet. When the transaction is processed by the financial institution at a predetermined settlement time in the future (e.g., as part of a periodic batch processing operation to generate monthly account statements), the financial institution provides a rebate of $5 to the user's financial institution account. Therefore, the department store, at the point of sale, may have no knowledge that the user will receive a rebate at some point in the future. In some embodiments, even the user may not be aware of the rebate at the point of sale (e.g., if the offer was automatically activated). In other embodiments, the point of sale terminal may provide an indication to at least one of the department store or the user that the user will receive a rebate at some point in the future.

Figure 1:
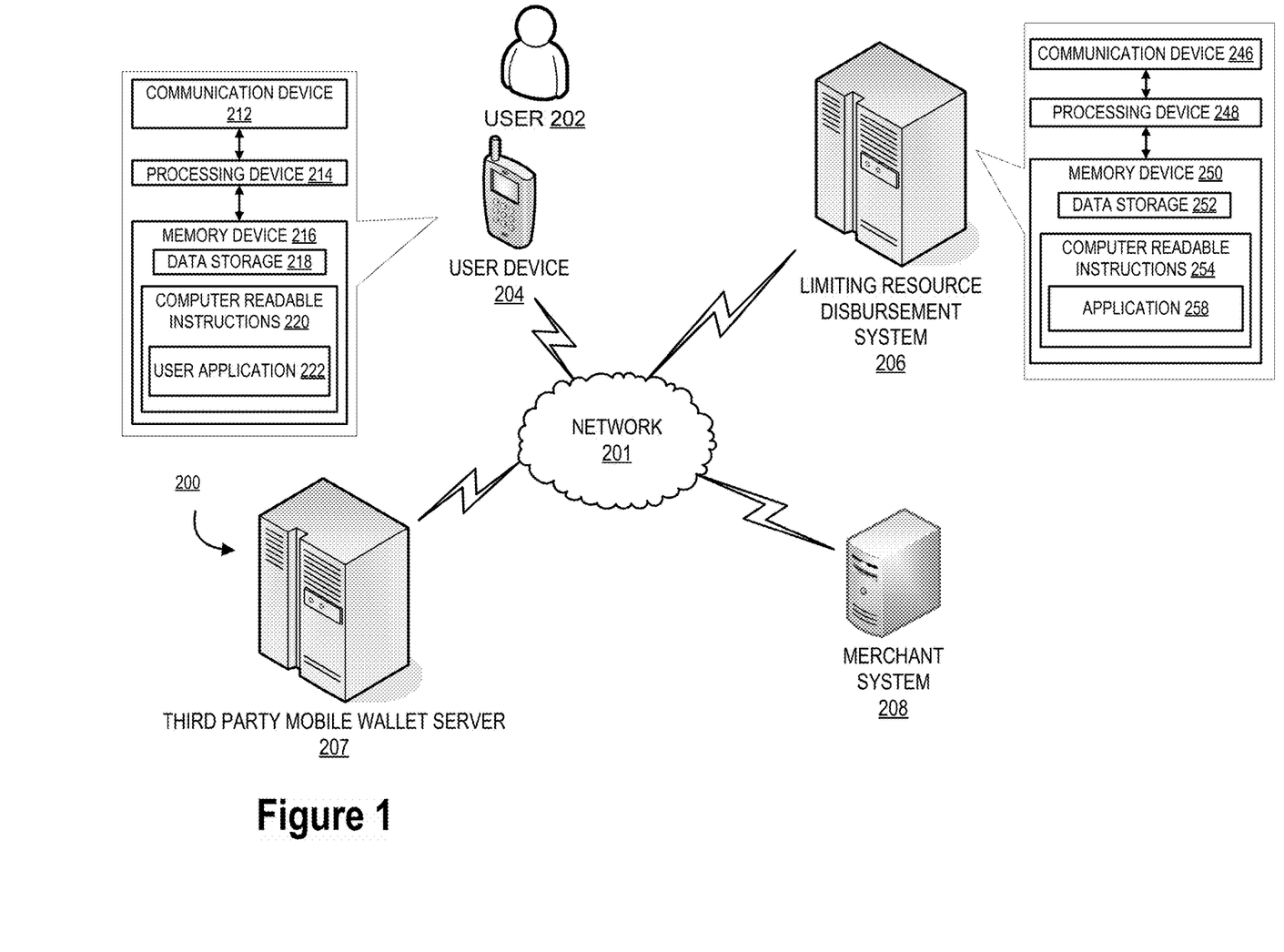
FIG. 1 illustrates a priority presentation integration for limiting resource disbursement system environment, in accordance with embodiments of the present invention.

FIG. 1 illustrates a priority presentation integration for limiting resource disbursement system environment 200, in accordance with one embodiment of the present invention. FIG. 1 provides the system environment 200 for which the distributive network system with specialized data feeds associated with resource distribution. FIG. 1 provides a unique system that includes specialized servers and system communicably linked across a distributive network of nodes required to perform the functions of generating logic code for priority presentation and backend processing of limiting resource disbursement offers.

As illustrated in FIG. 1, the merchant system 208 is operatively coupled, via a network 201 to the user device 204, third party mobile wallet server 207, and to the limiting resource disbursement system 206. In this way, the merchant system 208 can send information to and receive information from the user device 204, third party mobile wallet server 207, and the limiting resource disbursement system 206. FIG. 1 illustrates only one example of an embodiment of the system environment 200, and it will be appreciated that in other embodiments one or more of the systems, devices, or servers may be combined into a single system, device, or server, or be made up of multiple systems, devices, or servers.

The network 201 may be a system specific distributive network receiving and distributing specific network feeds and identifying specific network associated triggers. The network 201 may also be a global area network (GAN), such as the Internet, a wide area network (WAN), a local area network (LAN), or any other type of network or combination of networks. The network 201 may provide for wireline, wireless, or a combination wireline and wireless communication between devices on the network 201.

In some embodiments, the user 202 is an individual or entity that has mobile wallet functionality using the third party mobile wallet system on one or more user devices 204 associated with the user. In some embodiments, the user 202 has a user device, such as a mobile phone, tablet, computer, or the like. FIG. 1 also illustrates a user device 204. The user device 204 may be, for example, a desktop personal computer, business computer, business system, business server, business network, a mobile system, such as a cellular phone, smart phone, personal data assistant (PDA), laptop, or the like. The user device 204 generally comprises a communication device 212, a processing device 214, and a memory device 216. The processing device 214 is operatively coupled to the communication device 212 and the memory device 216. The processing device 214 uses the communication device 212 to communicate with the network 201 and other devices on the network 201, such as, but not limited to the limiting resource disbursement system 206, the merchant system 208, and the third party sever 207. As such, the communication device 212 generally comprises a modem, server, or other device for communicating with other devices on the network 201. Furthermore, the user device 204 has stored the mobile wallet application from the third party mobile wallet server 207.

The user device 204 comprises computer-readable instructions 220 and data storage 218 stored in the memory device 216, which in one embodiment includes the computer-readable instructions 220 of a user application 222. In some embodiments, the user application 222 allows a user 202 to send and receive communications with the limiting resource disbursement system 206.

As further illustrated in FIG. 1, the limiting resource disbursement system 206 generally comprises a communication device 246, a processing device 248, and a memory device 250. As used herein, the term "processing device" generally includes circuitry used for implementing the communication and/or logic functions of the particular system. For example, a processing device may include a digital signal processor device, a microprocessor device, and various analog-to-digital converters, digital-to-analog converters, and other support circuits and/or combinations of the foregoing. Control and signal processing functions of the system are allocated between these processing devices according to their respective capabilities. The processing device may include functionality to operate one or more software programs based on computer-readable instructions thereof, which may be stored in a memory device.

The processing device 248 is operatively coupled to the communication device 246 and the memory device 250. The processing device 248 uses the communication device 246 to communicate with the network 201 and other devices on the network 201, such as, but not limited to the merchant system 208, the third party server 207, and the user device 204. As such, the communication device 246 generally comprises a modem, server, or other device for communicating with other devices on the network 201.

As further illustrated in FIG. 1, the limiting resource disbursement system 206 comprises computer-readable instructions 254 stored in the memory device 250, which in one embodiment includes the computer-readable instructions 254 of an application 258. In some embodiments, the memory device 250 includes data storage 252 for storing data related to the system environment 200, but not limited to data created and/or used by the application 258.

In one embodiment of the limiting resource disbursement system 206 the memory device 250 stores an application 258. In one embodiment of the invention, the application 258 may associate with applications having computer-executable program code that generate and code a tag for implementation onto a product. Furthermore, the limiting resource disbursement system 206, using the processing device 248 codes certain communication functions described herein. In one embodiment, the computer-executable program code of an application associated with the application 258 may also instruct the processing device 248 to perform certain logic, data processing, and data storing functions of the application. The processing device 248 is configured to use the communication device 246 to communicate with and ascertain data from one or more merchant system 208, third party mobile wallet server 207, and/or user device 204.

In the embodiment illustrated in FIG. 1 and described throughout much of this specification, the application 258 may generate offers with logic code for implementation into the third party mobile wallet server 207 for further implementation into the mobile wallet of the user 202. The application 258 may also receive communications upon completion of a purchase using the offer and perform backend functional digestion of the use of the offer.

As illustrated in FIG. 1, the third party server 207 is connected to the merchant system 208, user device 204, and limiting resource disbursement system 206. The third party server 207 has the same or similar components as described above with respect to the user device 204 and the limiting resource disbursement system 206. While only one third party server 207 is illustrated in FIG. 1, it is understood that multiple third party mobile wallet server 207 may make up the system environment 200. The third party server 207 may be associated with one or more entities, such as product providers, service providers, marketers, material providers, resource allocators, and the like. In this way, the third party mobile wallet server 207 may be associated with any third party that the user 202 may transact with using a mobile wallet.

As illustrated in FIG. 1, the merchant system 208 is connected to the third party server 207, user device 204, and limiting resource disbursement system 206. The merchant system 208 may be associated with the limiting resource disbursement system 206 providing entity. The merchant system 208 has the same or similar components as described above with respect to the user device 204 and the limiting resource disbursement system 206. While only one merchant system 208 is illustrated in FIG. 1, it is understood that multiple merchant system 208 may make up the system environment 200. It is understood that the servers, systems, and devices described herein illustrate one embodiment of the invention. It is further understood that one or more of the servers, systems, and devices can be combined in other embodiments and still function in the same or similar way as the embodiments described herein. The merchant system 208 may generally include a processing device communicably coupled to devices as a memory device, output devices, input devices, a network interface, a power source, one or more chips, and the like. The merchant system 208 may also include a memory device operatively coupled to the processing device. As used herein, memory may include any computer readable medium configured to store data, code, or other information. The memory device may include volatile memory, such as volatile Random Access Memory (RAM) including a cache area for the temporary storage of data. The memory device may also include non-volatile memory, which can be embedded and/or may be removable. The non-volatile memory may additionally or alternatively include an electrically erasable programmable read-only memory (EEPROM), flash memory or the like.

The memory device may store any of a number of applications or programs which comprise computer-executable instructions/code executed by the processing device to implement the functions of the merchant system 208 described herein.

Figure 2:
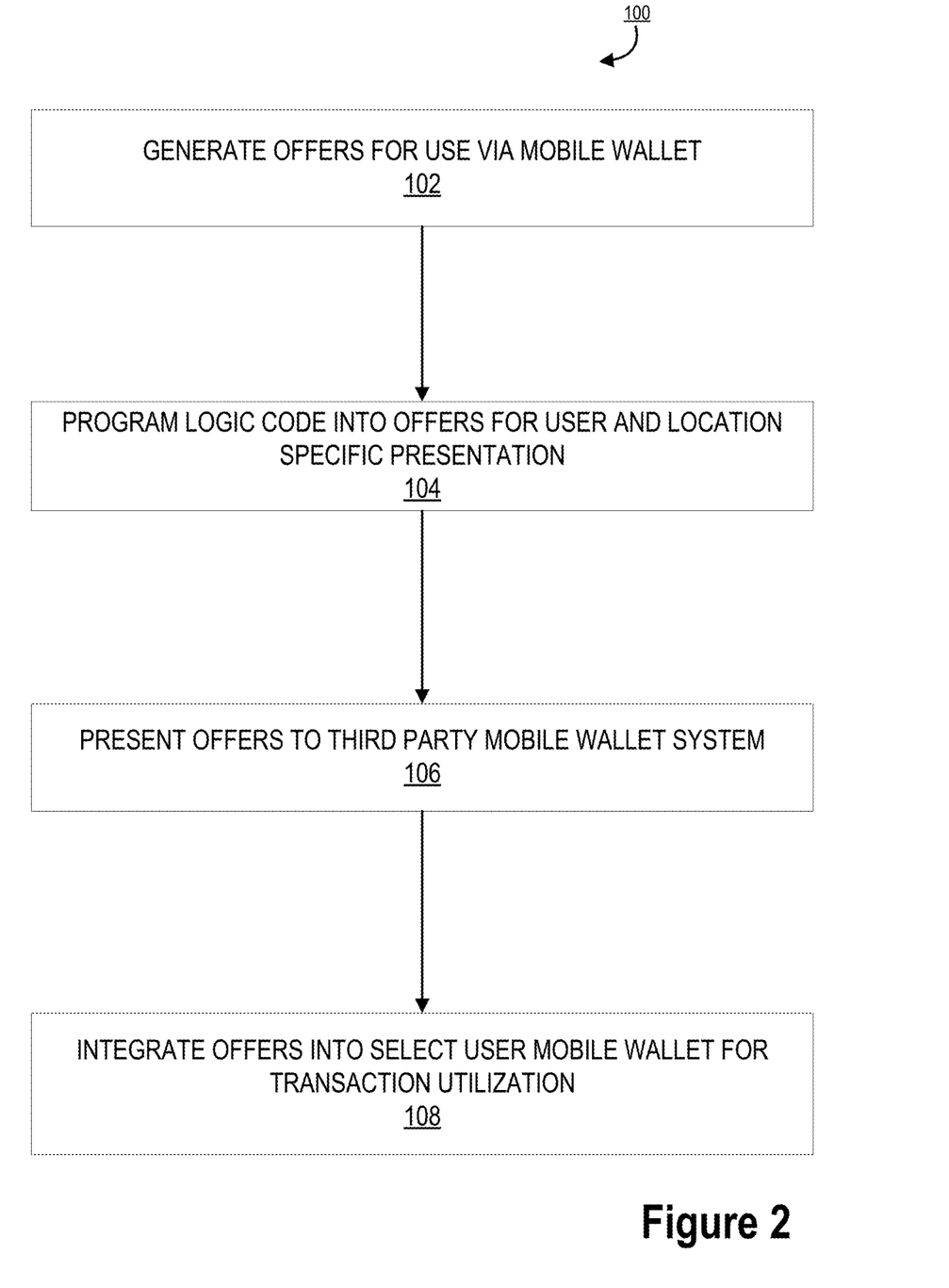
FIG. 2 is a flowchart illustrating a priority presentation integration on third party mobile wallet system process flow, in accordance with embodiments of the present invention.

FIG. 2 illustrates a flowchart for priority presentation integration on third party mobile wallet system process flow 100, in accordance with embodiments of the present invention. When resource disbursement limiter items such as offers, discounts, promotions, coupons, or the like are presented on a mobile wallet home screen. These items may be positioned in an order for the user to view. The user may be able to see a number of items and can tap the icon associated with the item to open the item. The system integrates logic into the third party mobile wallet system for targeting and positioning of the item first on the ordered view. Alternatively, if there are multiple items from multiple locations, the system ensures with the logic coding that the third party mobile wallet only presents the system associated item.

In some embodiments, the system codes logic within system associated items and integrates the coded logic into third party mobile wallet systems. This integration allows the system to present the system associated items at a location within a mobile wallet home screen on a user device. The system may code for the position it desires the item to be located within the home screen. This may be first on the list, the middle of the list, or the like. The location may be based on an identification of user selection preferences. For example, if the system identifies the user always selects items on the middle of the home screen, the system may integrate code for positioning the system associated items in that location. Furthermore, in some embodiments, the coded logic presented to the third party mobile wallet system via the system associated items may prevent the third party mobile wallet system from presenting other third party items to the user.

In some embodiments, the user may select the item from the mobile wallet home screen and use the offer in conjunction with a transaction. Once selected and used, the logic code embedded within the user's mobile wallet requires one or more of the user device and/or the merchant point of transaction to notify the financial institution associated with the item upon acceptance and use of the item. In this way, the system code may require the communication of acceptance of the item to be pushed to the financial institution for integration into the rewards or programs of the user account instantaneously.

As illustrated in block 102, the process 100 is initiated by generating offers for use via a mobile wallet. As illustrated below with respect to FIGS. 5-8, the system may generate offers. In some embodiments, the system may select offers for the user based on user transaction history, user selection, system selection, or the like. The system may extract transaction history from one or more accounts associated with the user to identify products, merchants, or categories of products that the user has purchased. For example, the system may identify that the user purchases electronics at Merchant A. The system may identify offers from either Merchant A or for electronics at various other merchants and generate offers for the user's mobile wallet usage.

Next, as illustrated in block 104, the process 100 continues by programming logic code into the offers that are generated for the user mobile wallet, with user and location specific presentation. In this way, the offers may be presented to the user via the mobile wallet based on the location of the mobile wallet. The system may extract geographic data from the user device via the user device GPS transmission signal. The location information may trigger one or more offers to be presented to the mobile wallet of the user via the third party mobile wallet server. The system may program the logic code into the offers for the user that are distributed to the third party mobile wallet server. The logic code may be read and implemented for the offer to be presented to the user's mobile wallet. In some embodiments, the implementation may present the offer to the user first on the list of offers provided on the mobile wallet. In other embodiments, the implementation may present the offer to the user in a specific location on the screen of the user device mobile wallet interface. These presentation locations are queued based on the logic code programmed into the offer at the system state prior to being sent to the third party mobile wallet server for presentation to a user's mobile wallet.

As illustrated in block 106, the process 100 continues by presenting the offers to the third party mobile wallet system. The offers may be presented to the user via the user's mobile wallet. As such, an interface, such as that illustrated in FIG. 4 below, presents the offers to the use upon opening of the mobile wallet application from the user device. The system may provide logic to integrate the offer into the third party mobile wallet application and direct the offer to a specific location within the interface. Furthermore, based on the user's transaction history, current location, or user input, the offer may be tailored for an amount, merchant, or product specifically for the user.

As illustrated in block 108, the process 100 continues by integrating the offers into the select user mobile wallets for transaction utilization. The user may select the offer from a list of offers on the user mobile wallet and utilize the offer for the transaction.

Figure 4:
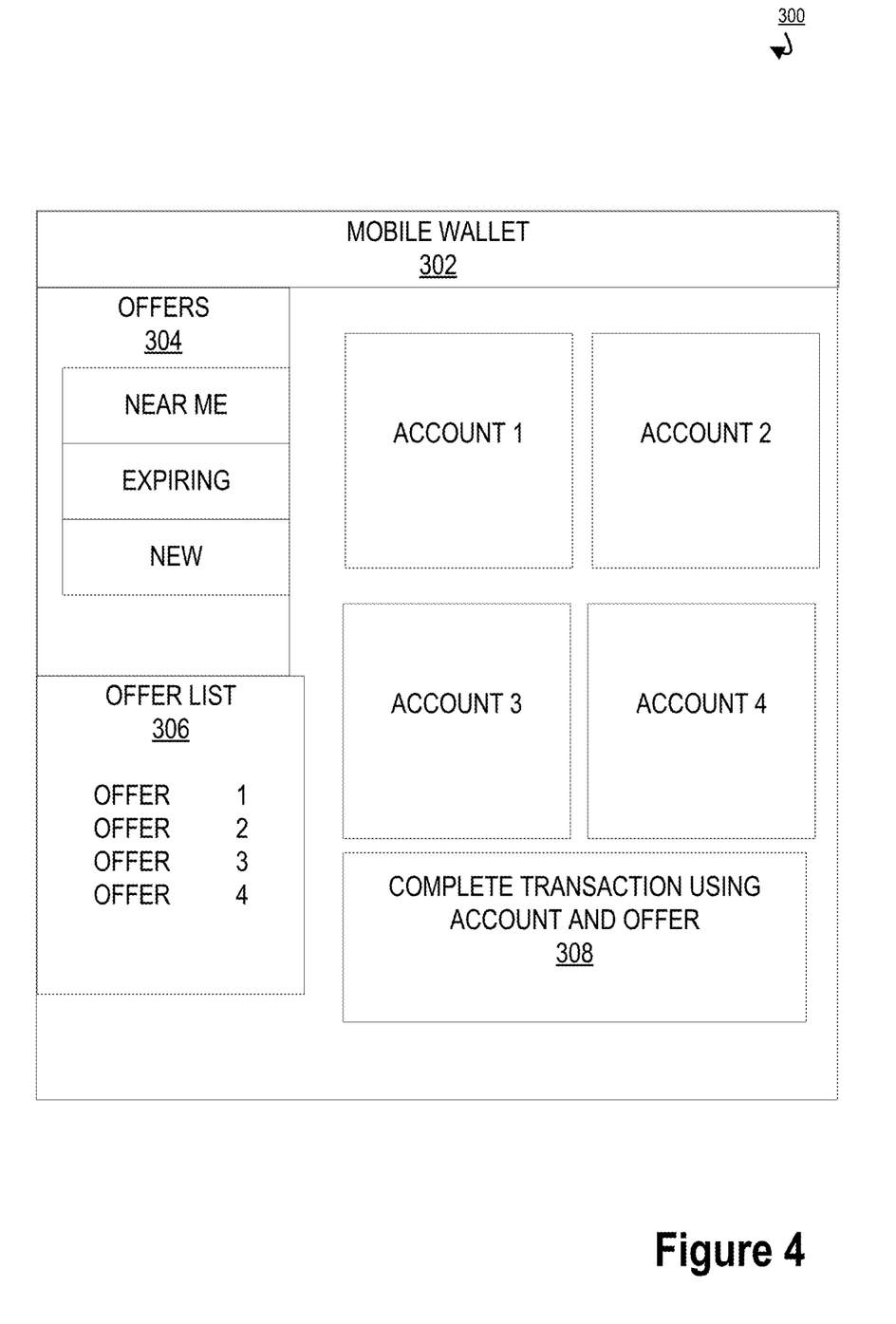
FIG. 4 is an interface illustrating a third party mobile wallet presented via a user device, in accordance with embodiments of the present invention.

FIG. 4 illustrates a third party mobile wallet presented via a user device 300, in accordance with embodiments of the present invention. As illustrated, the interface 300 illustrates the mobile wallet application being opened on a user device. As illustrated, the mobile wallet 302 is presented on the interface 300. The interface 300 may be presented to the user via the user device at a merchant prior to completing a transaction for a product or service.

In the interface 300 illustrated in FIG. 4, the user accounts are presented within the mobile wallet 302. In this interface 300, the user has four accounts to select to complete the transaction. These include Account 1, Account 2, Account 3, and Account 4. These accounts may be credit card accounts, debit accounts, checking accounts, savings accounts, or the like. Furthermore, the mobile wallet 302 may include an offer filter 304. The user may be able to filter the offers based on location, based on offer expiration date, based on newly available offers, and based on best savings associated with the offer.

In some embodiments, the system may present the best savings for the user in the mobile wallet 302. In this way, the user may have access to several offers for the same merchant, but only one will be presented based on the best savings for the user. In some embodiments, based on the user products being purchased, the best savings offer may be different. In this way, the system builds in logic for determining the best deal based on user history with the merchant, products currently being purchased, and the like.

As illustrated within the mobile wallet 302, the user may be presented to an offer list 306. The offer list presents a list of offers available to the user for the transaction. These offers may be for the products identified as being part of the transaction, for the merchant identified as being co-located with the user device, or the like. The offer list 306 may present offers in an order based on the category the user selected in block 304. The offer list 306 may include the offers available to the user, such as Offer 1, Offer 2, Offer 3, or Offer 4. The user may be able to select one or more of the offers presented in the offer list 306.

The logic code associated with the offers generated by the system may be located within the offer list 306. The logic code may code the offer for presentation in the mobile wallet 302 and within the offer list 306. In some embodiments, the logic code may present the offer first on the offer list 306. In other embodiments, the system may identify a location of the offer within the offer list 306 that the user normally selects. For example, the system may identify that the user selects the third offer on the list more often than any other offer in the offer list 306. As such, the system may generate logic code to present the offer from the system on the third offer position.

Furthermore, the system offer may be presented in the selected location, such as the first location, within the offer list 306 no matter the category that the user searches offers for within block 304.

Finally, as illustrated in block 308, once the user selects the account and the offer for the transaction, the user may select block 308 to complete the transaction using the selected account and offer.

Figure 3:
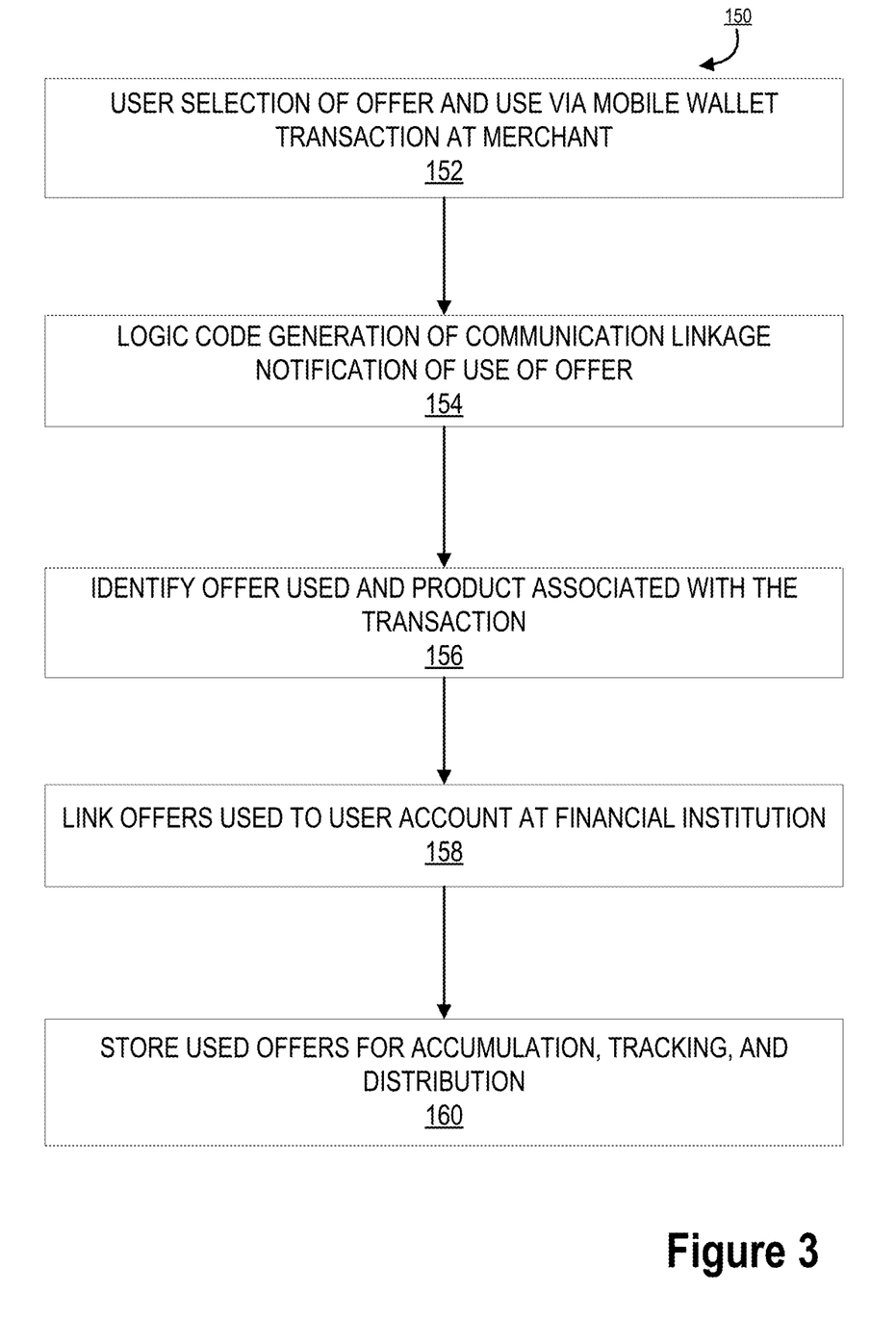
FIG. 3 is a flowchart illustrating a limiting resource distribution use integration, in accordance with embodiments of the present invention.

FIG. 3 illustrates a flowchart for limiting resource distribution use integration 150, in accordance with embodiments of the present invention. In some embodiments, the user may select the item from the mobile wallet home screen and use the offer in conjunction with a transaction. As illustrated in block 152, the process 150 is initiated by the user selection of the offer and utilization of the offer to complete a transaction via a mobile wallet at a merchant location. Next, as illustrated in block 154 the process 150 continues by notifying the system of the use of the offer. The notification of the use of the offer is sent to the system via a communication linkage generated between the merchant, mobile wallet, third party mobile wallet server, and the system for notification of use of the offer associated with the system. As such, once selected and used, the logic code embedded within the user's mobile wallet requires one or more of the user device and/or the merchant point of transaction to notify the system and/or the financial institution associated with the offer upon acceptance and use of the offer. In this way, the system code may require the communication of acceptance of the item to be pushed to the financial institution for integration into the rewards or programs of the user account instantaneously.

As illustrated in block 156, the process 150 continues by identifying the offer used and the product associated with the transaction. Once identified, the system may link the offer used to the user account at the financial institution. As such, the system may incorporate the offer into the user account. In some embodiments, the offer may only be used with a specific user account. Furthermore, the offer may be accumulated with one or more other offers used during a transaction using the user account for payment for the transaction, thus providing additional rewards for the user using the offers and the specific user account. As such, if a user utilizes an offer, the transaction must be purchased using the user account. In this way, the system code may require the communication of acceptance of the item to be pushed to the financial institution for integration into the rewards or programs of the user account instantaneously.

Next, as illustrated in block 158, the process continues to link the offers used to the user account at the financial institution. In this way, the system code may require the communication of acceptance of the item to be pushed to the financial institution for integration into the rewards or programs of the user account instantaneously. Finally, as illustrated in block 160, the process 150 is completed by storing the used offers for accumulation, tracking, and distribution within the system. In this way, the system may store the used offers for accumulation of one or more offers by the user in order to receive additional rewards or bonuses for using the offers. In some embodiments, the system may store the offers to track the offers that are accepted by the user for providing an identification of a type or category of offer that the user may utilize in the future.

Figure 5:
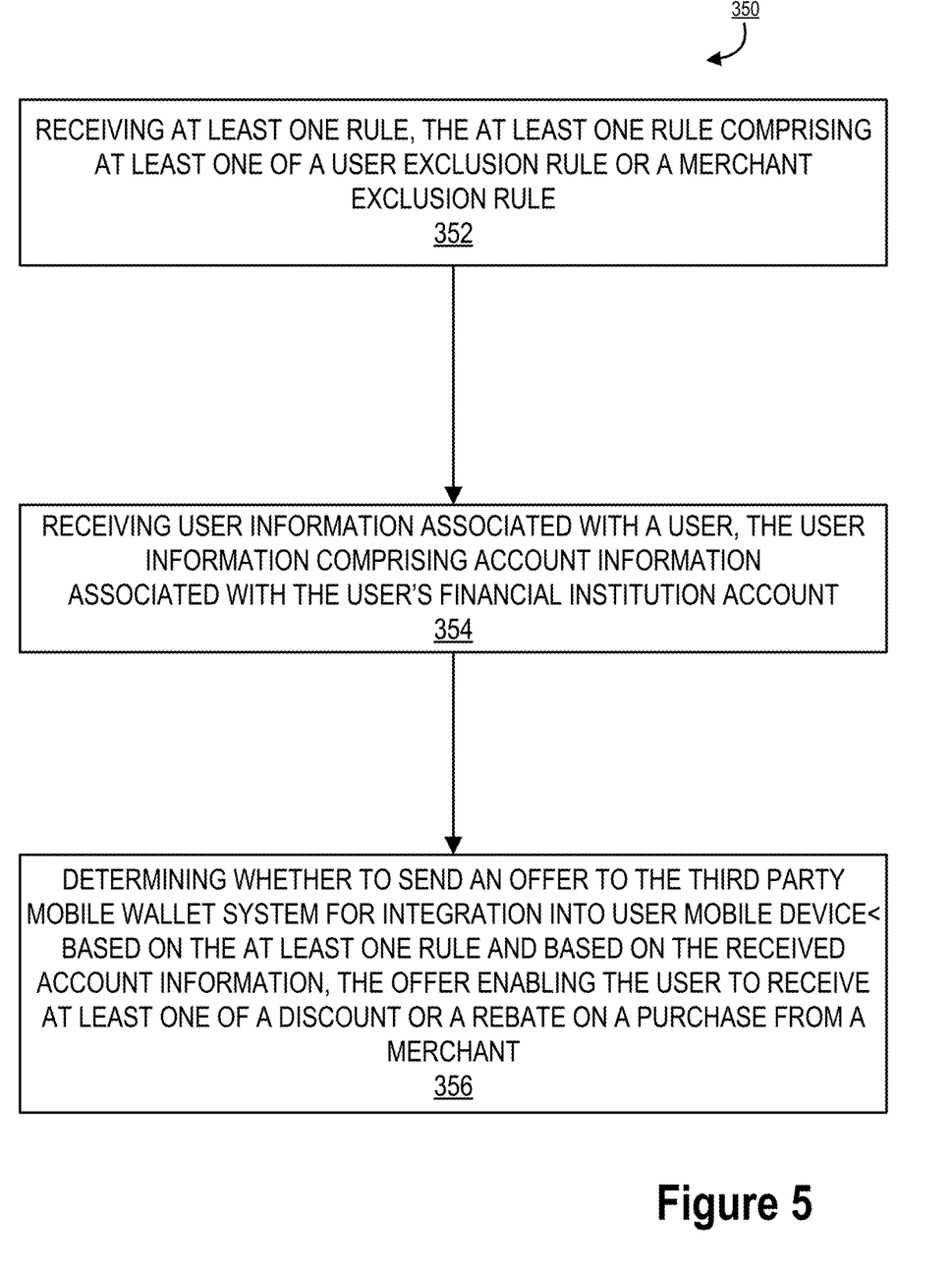
FIG. 5 is a flowchart illustrating a general process flow for generating an offer, in accordance with embodiments of the present invention.

FIG. 5 illustrates a flowchart for the general process flow for generating an offer 350, in accordance with embodiments of the present invention. As illustrated in block 352, the process 350 is initiated by receiving at least one rule, the at least one rule comprising at least one of a user exclusion (or user filtering) rule or a merchant exclusion (or merchant filtering) rule. The rules may be generated based on use history, merchant decisions, and/or system determined. In this way, the rules may determine offers that may be provided to a user that a user may desire to use.

As used herein, a user exclusion rule is a rule that excludes some users from receiving offers. In some embodiments, the at least one user exclusion rule comprises an affinity exclusion rule. Therefore, if the financial institution (or a merchant partner associated with the financial institution) already has an existing relationship (e.g., for providing or sending offers associated with the particular merchant) with some users via an affinity program, those users are excluded from receiving an offer. The affinity exclusion rule comprises at least one of a full affinity exclusion rule or a partial affinity exclusion rule. When the affinity rule comprises a full affinity exclusion rule, the user is completely excluded from receiving an offer (e.g., an offer associated with a particular merchant) if the financial institution (or a merchant partner associated with the financial institution) already has an existing relationship with the user. When the affinity rule comprises a partial affinity exclusion rule, the user is excluded from receiving an offer associated with a particular product, service, or industry associated with a particular merchant that already has an existing relationship with the user for the particular product, service, or industry, but the user may receive offers associated with other products, services, or industries associated with the particular merchant. Additionally or alternatively, the user is excluded from receiving an offer associated with a competitor of a particular merchant if that particular merchant already has an existing relationship with the user.

In some embodiments, an at least one user exclusion rule comprises an account exclusion rule. Therefore, for example, if a user's account has a balance (or another account characteristic) that is lower than predetermined threshold, the user is excluded from receiving an offer.

In some embodiments, a merchant exclusion rule is a rule that excludes some merchants from providing offers to users associated with the financial institution. In some embodiment, the at least one merchant exclusion rule comprises a merchant category code exclusion rule. Therefore, a merchant associated with a predetermined merchant category code (e.g., a healthcare code) is excluded from providing an offer. However, the financial institution may set up a list of merchants that trigger exceptions. Merchants that trigger exceptions can provide offers even if these merchants are associated with the excluded merchant category codes.

As illustrated in block 354, the process 350 continues by receiving user information associated with a user, the user information comprising account information associated with the user's financial institution account. The account information may allow the system to identify one or more previous transactions to match one or more offers to the user. In some embodiments, account information, as used herein, refers to information associated with the user's financial institution account(s) managed by a single financial institution. In other embodiments, account information may refer to information associated with the user's financial institution accounts managed by multiple distinct financial institutions.

In some embodiments, the account information comprises a transaction history associated with the user's financial institution account. The transaction history includes the types of transactions, frequency of transactions, amount of each transaction, merchants associated with transactions, account balance history, or the like. Additionally or alternatively, the account information may or may not comprise information associated with incorrect, inconsistent, incomplete, or corrupted transactions. As used herein, a transaction may comprise a purchase, a deposit, a withdrawal, a credit, a debit, or the like.

In some embodiments, the personal information further comprises social network information associated with the user's social network account or other non-account related information associated with the user. In some embodiments, the user information further comprises user information (e.g., personal information, account information, or the like) associated with the user's immediate or extended family members or contacts (e.g., as determined from social network information).

As illustrated in block 356, the process 350 continues by determining whether to send an offer to the third party mobile wallet system to direct the offer to the user via the user mobile wallet, based on the at least one rule and based on the received user information, the offer enabling the user to receive at least one of a discount or a rebate on a purchase from a merchant. As described previously, in some embodiments, the discount or rebate is received at a point of time in the future when the transaction that qualifies for the offer is processed by the financial institution.

In some embodiments, when a purchase transaction is processed by the financial institution at a predetermined time in the future (i.e., at settlement time or processing time), the system determines whether the offer is still active and whether the offer is still valid with respect to both the user and the merchant. This post-transaction process may be referred to as an offer reconciliation process. The offer is still active if the offer has not been revoked by at least one of the financial institution or the merchant and/or if the offer has not expired.

The offer is valid for the user if the user is not excluded under any user exclusion rules. As described previously, the user is presented with the merchant's offer if the user is not excluded under any user exclusion rules. In some embodiments, in order for the offer to be valid, the user cannot be excluded under any user exclusion rules that were in force at the time of the purchase transaction. Additionally or alternatively, in some embodiments, in order for the offer to remain valid, the user cannot be excluded under any user exclusion rules that are in force at the time of settlement of the offer. Therefore, in some embodiments, the user cannot be excluded under any new user exclusion rules that have been introduced since the purchase transaction. If both the user and the merchant are not excluded at the time of settlement, the offer is still valid and the financial institution provides a rebate to the user's financial institution account. In some embodiments, if at least one of the user or the merchant is excluded at the time of settlement, the offer is invalid and the financial institution does not provide a discount or rebate to the user's financial institution account. However, in alternate embodiments, even if at least one of the user or the merchant is excluded at the time of settlement, the offer remains valid as long as the user and the merchant were not excluded at the time of the purchase transaction, and consequently the financial institution provides a discount or rebate to the user's financial institution account.

Figure 6:
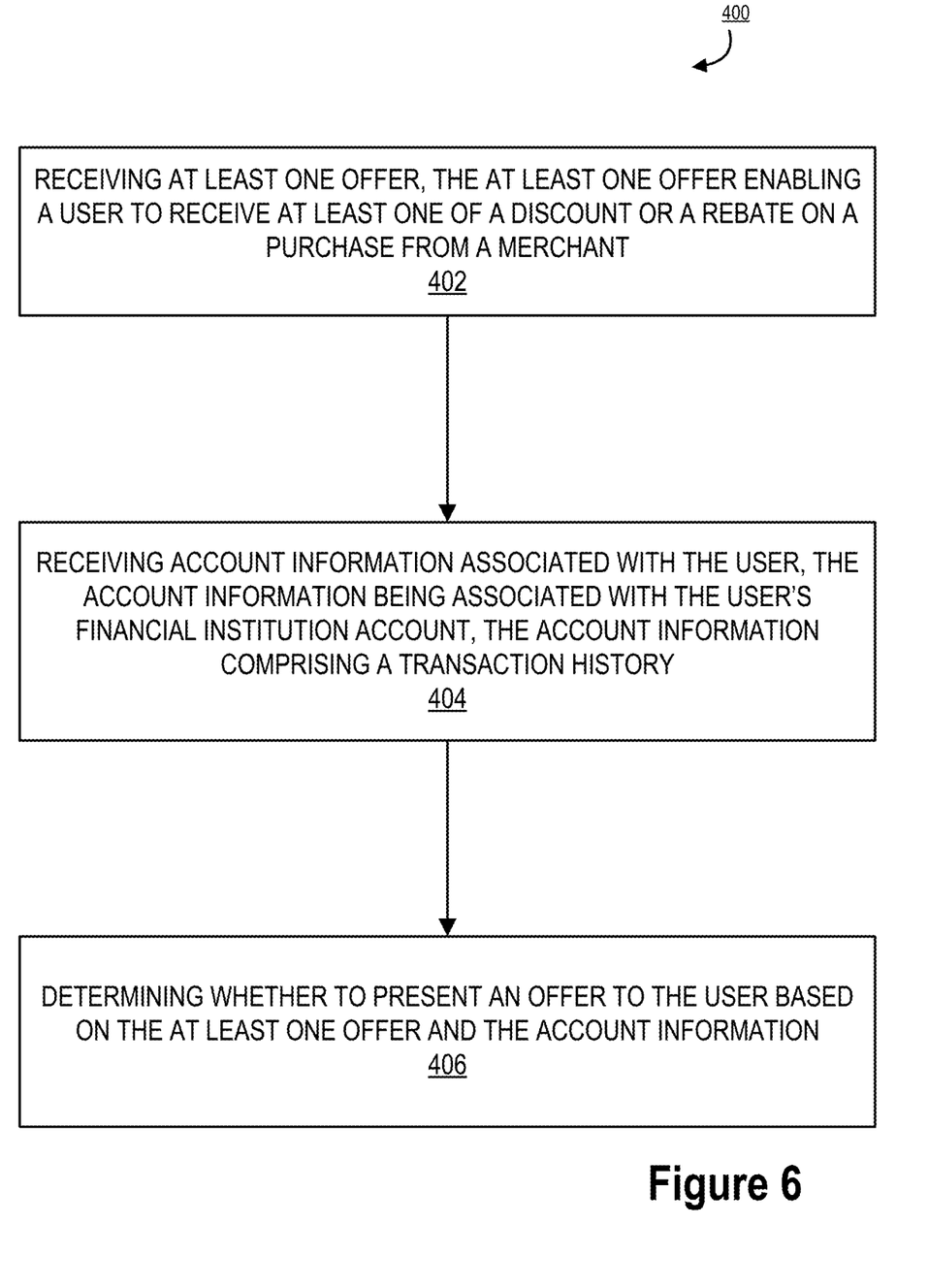
FIG. 6 is a flowchart illustrating a general process flow for determining offer presentation, in accordance with embodiments of the present invention.

FIG. 6 illustrates a general process flow for determining offer presentation 400, in accordance with embodiments of the present invention. As illustrated in block 402, the process 400 is initiated by receiving at least one offer enabling a user to receive at least one of a discount or a rebate on a purchase from a merchant during a transaction using a mobile wallet.

As illustrated in block 404 the process 400 continues by receiving account information associated with the user, the account information being associated with the user's financial institution account, the account information comprising a transaction history.

As illustrated in block 406, the process 400 continues by determining whether to present an offer to the user based on the at least one offer and the account information. Therefore, the determining step comprises matching an offer to an account (e.g., based on the account information) such that there is a high likelihood (e.g., greater than a threshold probability) that the user associated with the account uses the offer to make a purchase using a payment method associated with the account.

In some embodiments, the presented offer is associated with a selected payment method with the mobile wallet system. Exemplary payment methods include paying via a credit card, debit card, personal check, mobile device, or the like. The exemplary payment methods are not limited to those described herein. In some embodiments, the payment method is selected by at least one of the financial institution, the merchant, or the user.

In some embodiments, the offer is presented via at least one of a user interface associated with the user's financial institution account (e.g., online banking account, mobile banking account on a portable mobile communication device, or the like) or a user interface associated with the user's social network account. In some embodiments, the offer is inserted into or presented alongside (e.g., on the right, left, top, bottom side of a transaction, or between multiple transactions) the transaction history that is presented on the user's online banking account or mobile banking account. Therefore, for example, if ten transactions are listed in the transaction history, the offer may be presented between the fourth and fifth transactions. In some embodiments, the offer may be related to the transaction which the offer is presented alongside (e.g., the fourth and/or fifth transaction in the above example). For example, if the fourth transaction is a purchase of item 'A' from merchant 'A,' the offer is for a purchase of item 'A' (e.g., from any merchant) or for a purchase from merchant 'A' (e.g., for any item) or for a purchase of item 'A' from merchant 'A.' Alternatively, the offer may be for a purchase of a substitute of item 'A' (e.g., from merchant 'A' or from any other merchant). In some embodiments, the offer is transmitted to the user's email account. In other embodiments, the offer is transmitted, via text message, to the user's mobile device.

In some embodiments, the presented offer is an offer to receive at least one of a discount or a rebate on at least one of a purchase previously made by the user (e.g., a previous transaction associated with the user's financial institution account), a purchase from a merchant from which the user previously made a purchase, an alternative to the purchase previously made by the user, or an alternative to the purchase from the merchant from which the user previously made a purchase. The alternative to the purchase may be determined based on transaction histories associated with a plurality of financial institution accounts associated with multiple users. In some embodiments, the presented offer is an offer to receive at least one of a discount or a rebate on a product or service related to a previous purchase made by the user. For example, if the user previously bought a stove, the offer is a discount or rebate for a dishwasher or a stove maintenance service. In some embodiments, an offer that is sent to a third party mobile wallet system that incorporates the offer into the user's mobile device for mobile wallet usage.

Figure 7:
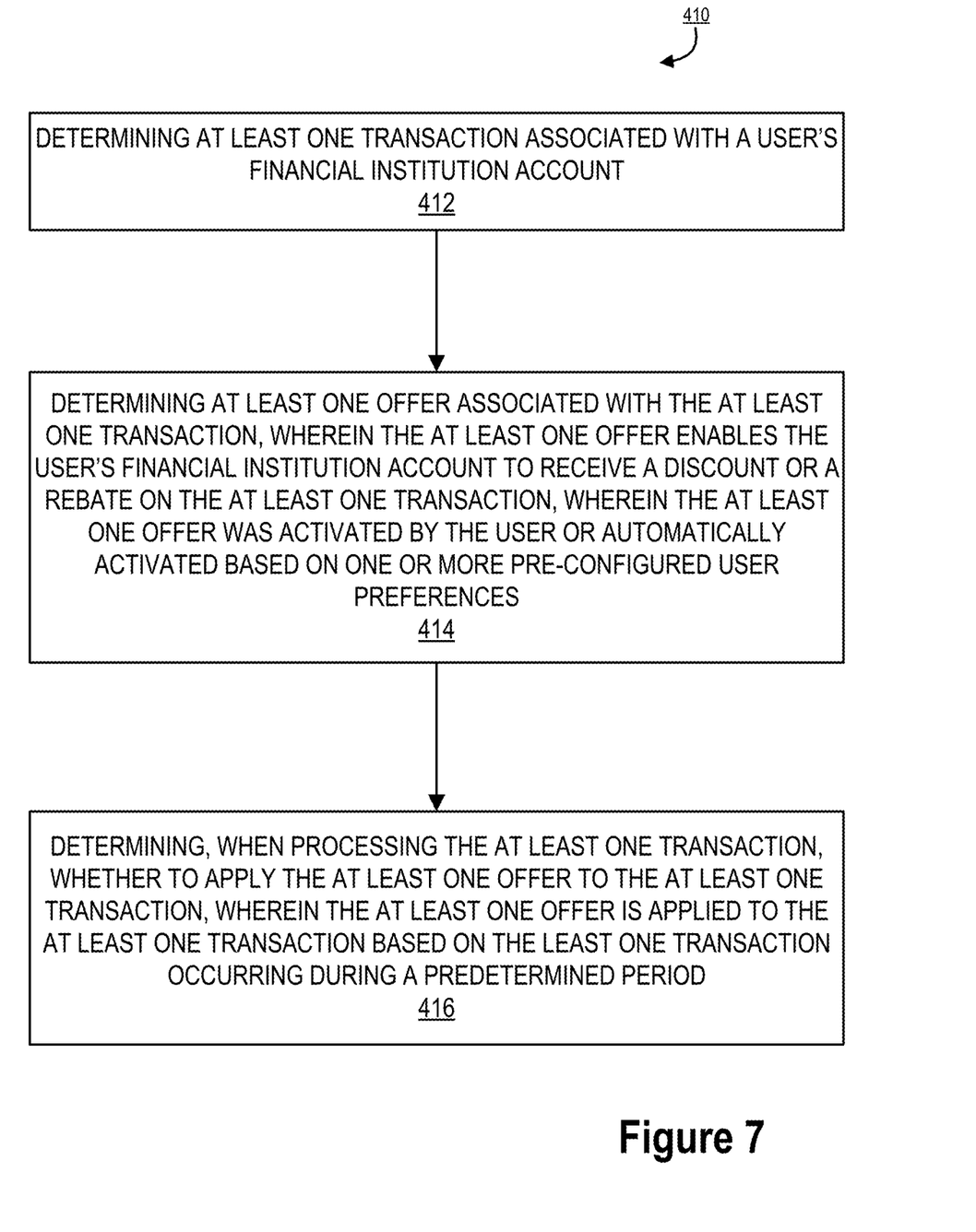
FIG. 7 is a flowchart illustrating a general process flow for applying offers to purchase transactions at settlement, in accordance with embodiments of the present invention.

FIG. 7 is a flowchart illustrating a general process flow for applying offers to purchase transactions at settlement 410, in accordance with embodiments of the present invention. As illustrated in block 412, the process 410 determines at least one transaction associated with a user's financial institution account that the user utilized his/her mobile wallet to complete the transaction. This indication may be determined by a communication from the merchant, the user mobile wallet, or the third party mobile wallet system at the point of transaction terminal during the completion of a transaction using the mobile wallet. As illustrated in block 414, the process 410 further comprises determining at least one offer associated with the at least one transaction, wherein the at least one offer enables the user's financial institution account to receive a discount or a rebate on the at least one transaction, wherein the at least one offer was activated by the user or automatically activated based on one or more pre-configured user preferences. The offer may be provided via the user's mobile wallet. The user may select the offer from the mobile wallet for use during the transaction.

Next, as illustrated in block 416, the process 410 continues by determining, when processing the at least one transaction, whether to apply the at least one offer to the at least one transaction, wherein the at least one offer is applied to the at least one transaction upon selection of the offer via the interface on the user's mobile wallet from a third party mobile wallet system.

In some embodiments, at settlement, the user may select a payment method. Alternatively, the system may determine a payment method (e.g., credit card, debit card, electronic funds transfer, mobile device payment, physical check, or the like) associated with the transaction in order to accept and allow the user to utilize the offer. If the payment method qualifies as an accepted payment method as defined by offer information associated with the offer (defined by at least one of the merchant or the financial institution), the rebate or discount associated with the offer is applied to the user's financial institution account.

When the rebate or discount is applied to the user's financial institution account, the system described herein may transmit a message to the user (e.g., text message, email, social networking message, or the like) indicating the amount of rebate or discount applied to the user's financial institution account. The message may indicate how the rebate or discount amount is calculated (e.g., which transactions were considered, which transactions were excluded, or the like). When a rebate or discount associated with an activated offer is not applied to the user's financial institution account, the system may transmit a message to the user indicating the reasons why the rebate or discount is not applied to the user's financial institution account (e.g., a user associated with the transaction may be excluded, a payment method associated with the transaction may be excluded, an amount associated with the transaction may be smaller than the minimum amount required to qualify for the offer, or the like).

Figure 8:
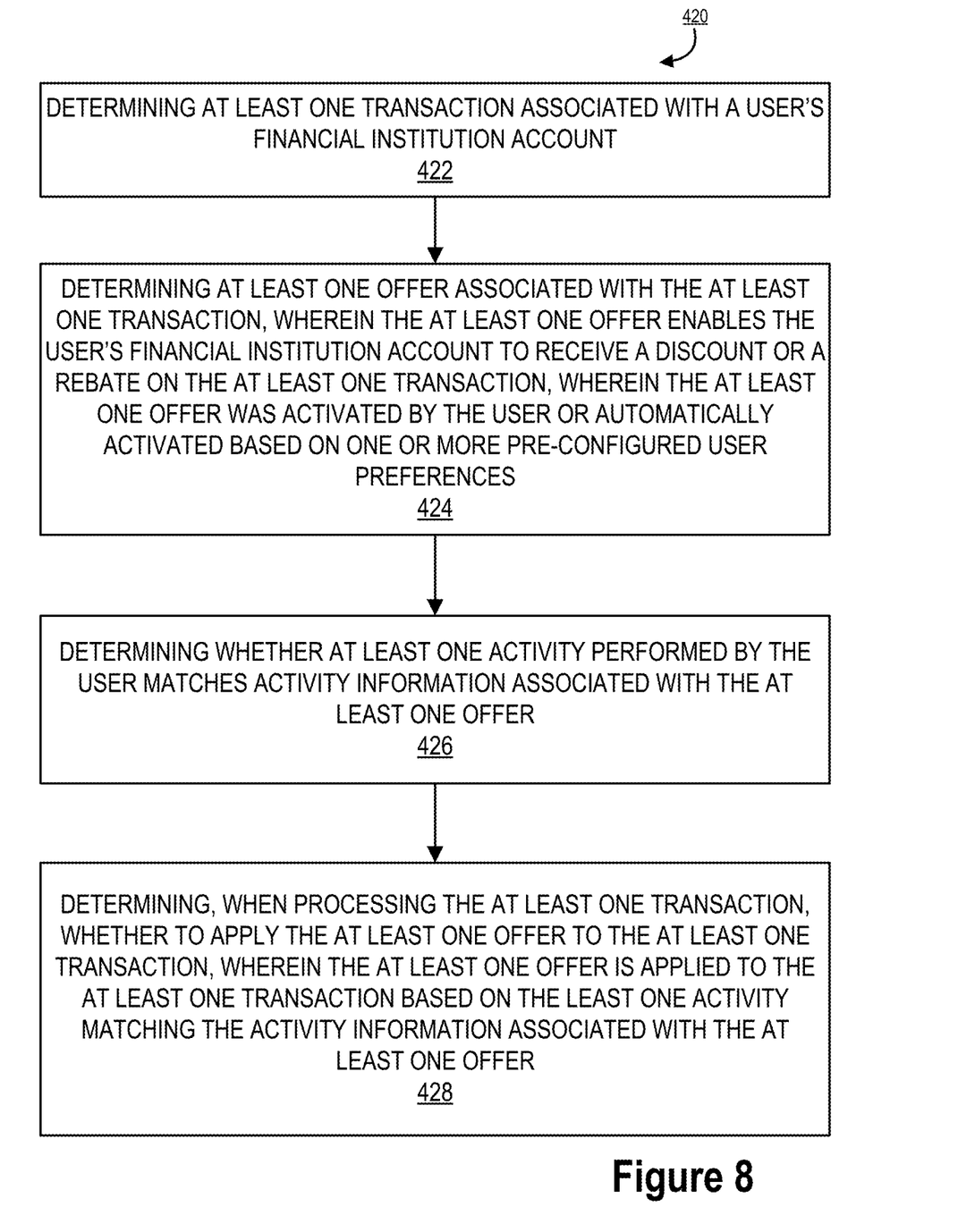
FIG. 8 is a flowchart illustrating a general process flow for applying offers to purchase transactions at settlement, in accordance with embodiments of the present invention.

FIG. 8 illustrates a flowchart for the general process flow for applying offers to purchase transactions at settlement 420, in accordance with embodiments of the present invention. As illustrated in block 422, the user may have completed a transaction using a mobile wallet. The system may determine that the transaction was associated with a user's financial institution account. Next, as illustrated in block 424 the process 420 determining at least one offer that the user selected on his/her mobile wallet to be associated with the at least one transaction. The offer enables the user's financial institution account to receive a discount or a rebate on the at least one transaction, wherein the at least one offer was activated by the user via selection of the offer on the interface associated with the mobile wallet. In some embodiments, the offer may be automatically activated based on one or more pre-configured user preferences.

Next, as illustrated in block 426 the process 420 continues by determining whether at least one activity performed by the user substantially matches activity information associated with the at least one offer. At block 428, the process 420 continues by determining, when processing the at least one transaction, to apply the at least one offer to the at least one transaction. Processing a transaction and/or an offer may also be referred to as settling a transaction and/or an offer. As explained herein, in some embodiments, either an offer or a substitute of the offer (when a substitution condition is satisfied) may be applied to the transaction at settlement. At settlement, the system receives information regarding the user's performance of the activity. In some embodiments, the system receives information from a system associated with the merchant. In other embodiments, the system receives information from the user (or from the user's mobile device) regarding the user's performance of the activity.

In some embodiments, after the system determines that the user performed the activity specified by the offer, and after calculating the discount or rebate to be applied to the user's financial institution account, the system is configured to notify the user that the user successfully performed the activity specified by the offer and is configured to notify the user of the resulting rebate or discount as a result of successfully performing the activity. In some embodiments, the system is configured to notify the user that the user did not successfully perform the activity specified by the offer, and is configured to notify the user of the resulting rebate or discount, if any, as a result of not successfully performing the activity. In some embodiments, the notification also includes the reasons why the user did not successfully perform the activity specified by the offer (e.g., the user did not post the specified message on the social network, the user did not post the specified message at the specified time, or the like).

As will be appreciated by one of ordinary skill in the art, the present invention may be embodied as an apparatus (including, for example, a system, a machine, a device, a computer program product, and/or the like), as a method (including, for example, a business process, a computer-implemented process, and/or the like), or as any combination of the foregoing. Accordingly, embodiments of the present invention may take the form of an entirely software embodiment (including firmware, resident software, microcode, and the like), an entirely hardware embodiment, or an embodiment combining software and hardware aspects that may generally be referred to herein as a "system." Furthermore, embodiments of the present invention may take the form of a computer program product that includes a computer-readable storage medium having computer-executable program code portions stored therein. As used herein, a processor may be "configured to" perform a certain function in a variety of ways, including, for example, by having one or more special-purpose circuits perform the functions by executing one or more computer-executable program code portions embodied in a computer-readable medium, and/or having one or more application-specific circuits perform the function. As such, once the software and/or hardware of the claimed invention is implemented the computer device and application-specific circuits associated therewith are deemed specialized computer devices capable of improving technology associated with the in authorization and instant integration of a new credit card to digital wallets.

It will be understood that any suitable computer-readable medium may be utilized. The computer-readable medium may include, but is not limited to, a non-transitory computer-readable medium, such as a tangible electronic, magnetic, optical, infrared, electromagnetic, and/or semiconductor system, apparatus, and/or device. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as a propagation signal including computer-executable program code portions embodied therein.

It will also be understood that one or more computer-executable program code portions for carrying out the specialized operations of the present invention may be required on the specialized computer include object-oriented, scripted, and/or unscripted programming languages, such as, for example, Java, Perl, Smalltalk, C++, SAS, SQL, Python, Objective C, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

It will further be understood that some embodiments of the present invention are described herein with reference to flowchart illustrations and/or block diagrams of systems, methods, and/or computer program products. It will be understood that each block included in the flowchart illustrations and/or block diagrams, and combinations of blocks included in the flowchart illustrations and/or block diagrams, may be implemented by one or more computer-executable program code portions. These one or more computer-executable program code portions may be provided to a processor of a special purpose computer for the authorization and instant integration of credit cards to a digital wallet, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

It will also be understood that the one or more computer-executable program code portions may be stored in a transitory or non-transitory computer-readable medium (e.g., a memory, and the like) that can direct a computer and/or other programmable data processing apparatus to function in a particular manner, such that the computer-executable program code portions stored in the computer-readable medium produce an article of manufacture, including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with operator and/or human-implemented steps in order to carry out an embodiment of the present invention.

While certain exemplary embodiments have been described and shown in the accompanying drawings, it is to be understood that such embodiments are merely illustrative of, and not restrictive on, the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations and modifications of the just described embodiments can be configured without departing from the scope and spirit of the invention. Therefore, it is to be understood that, within the scope of the appended claims, the invention may be practiced other than as specifically described herein.

What is claimed is:

1. A system for priority presentation integration onto a third party system, the apparatus comprising:
   a memory device with computer-readable program code stored thereon;
   a communication device;
   a processing device operatively coupled to the memory device and the communication device, wherein the processing device is configured to execute the computer-readable program code to:
      generate a resource disbursement limiter with programmed logic code that is directed to a presentation location within a third party mobile application, wherein the programmed logic code is triggered for integration into the third party mobile application based on location of a mobile device of a user that includes the third party mobile application;
      apply a merchant exclusion rule and a user exclusion rule to the resource disbursement limiter to determine authorized transmittal of the resource disbursement limiter, wherein the user exclusion excludes resource disbursement limiters that are different from user transaction history;
      transmit the resource disbursement limiter at the third party system for storage and integration into the third party mobile application for the user for integration into the mobile device of the user;
      receive indication of user utilization of the resource disbursement limiter at a merchant location via the third party mobile application, wherein user utilization of the resource disbursement limiter triggers logic code generation of a communication linkage notification of use of the resource disbursement limiter and a product associated with the use; and
      store the received indication and compile previously received indications with the user account for additional generation of resource disbursement limiters and tracking of resource disbursement limiters based on the user utilization of the resource disbursement limiter.

2. The system of claim 1, wherein the resource disbursement limiter is an offer for the user to use during a transaction for purchasing a product or service, within the offer is a discount on a resource requirements for purchasing the product or the service.

3. The system of claim 1, further comprising presenting the resource disbursement limiter as an offer to the user via an interface associated with the third party mobile application during a transaction with a merchant, wherein the offer is positioned in a priority position within a list of offers presented to the user via the interface associated with the third party mobile application.

4. The system of claim 1, wherein the third party mobile application is a mobile wallet application integrated into a user device for use by the user to complete a transaction with one or more accounts.

5. The system of claim 1, further comprising positioning the resource disbursement limiter first on a list of offers provided on an interface associated with a mobile wallet that is provided to the user from the third party for completion of a transaction.

6. The system of claim 1, further comprising positioning the resource disbursement limiter first on a list of offers provided on an interface associated with a mobile wallet based on an identification of a user device accessing the mobile wallet is within a predetermined geographical location.

7. The system of claim 1, wherein receiving an indication of user utilization of the resource disbursement limiter at a merchant location further comprises user selection of an offer via a mobile wallet application provided by the third party to complete a transaction at the merchant using the mobile wallet, wherein the indication is transmitted via a communication link from the merchant or a user device associated with the mobile wallet.

8. The system of claim 1, wherein the resource disbursement limiter is an offer that is generated for the user, wherein the offer is for products or services that are the same or associated with products or services that the user has purchased in the past based on a review of user transaction history.

9. A computer program product for priority presentation integration onto a third party system, the computer program product comprising at least one non-transitory computer-readable medium having computer-readable program code portions embodied therein, the computer-readable program code portions comprising:
   an executable portion configured for generating a resource disbursement limiter with programmed logic code that is directed to a presentation location within a third party mobile application, wherein the programmed logic code is triggered for integration into the third party mobile application based on location of a mobile device of a user that includes the third party mobile application;
   an executable portion configured for applying a merchant exclusion rule and a user exclusion rule to the resource disbursement limiter to determine authorized transmittal of the resource disbursement limiter, wherein the user exclusion excludes resource disbursement limiters that are different from user transaction history;
   an executable portion configured for transmitting the resource disbursement limiter at the third party system for storage and integration into the third party mobile application for the user for integration into the mobile device of the user;

an executable portion configured for receiving indication of user utilization of the resource disbursement limiter at a merchant location via the third party mobile application, wherein user utilization of the resource disbursement limiter triggers logic code generation of a communication linkage notification of use of the resource disbursement limiter and a product associated with the use; and an executable portion configured for storing the received indication and compile previously received indications with the user account for additional generation of resource disbursement limiters and tracking of resource disbursement limiters based on the user utilization of the resource disbursement limiter.

10. The computer program product of claim 9, wherein the resource disbursement limiter is an offer for the user to use during a transaction for purchasing a product or service, within the offer is a discount on a resource requirements for purchasing the product or the service.

11. The computer program product of claim 9, further comprising an executable portion configured for presenting the resource disbursement limiter as an offer to the user via an interface associated with the third party mobile application during a transaction with a merchant, wherein the offer is positioned in a priority position within a list of offers presented to the user via the interface associated with the third party mobile application.

12. The computer program product of claim 9, wherein the third party mobile application is a mobile wallet application integrated into a user device for use by the user to complete a transaction with one or more accounts.

13. The computer program product of claim 9, further comprising an executable portion configured for positioning the resource disbursement limiter first on a list of offers provided on an interface associated with a mobile wallet that is provided to the user from the third party for completion of a transaction.

14. The computer program product of claim 9, further comprising an executable portion configured for positioning the resource disbursement limiter first on a list of offers provided on an interface associated with a mobile wallet based on an identification of a user device accessing the mobile wallet is within a predetermined geographical location.

15. The computer program product of claim 9, wherein receiving an indication of user utilization of the resource disbursement limiter at a merchant location further comprises user selection of an offer via a mobile wallet application provided by the third party to complete a transaction at the merchant using the mobile wallet, wherein the indication is transmitted via a communication link from the merchant or a user device associated with the mobile wallet.

16. The computer program product of claim 9, wherein the resource disbursement limiter is an offer that is generated for the user, wherein the offer is for products or services that are the same or associated with products or services that the user has purchased in the past based on a review of user transaction history.

17. A computer-implemented method for priority presentation integration onto a third party system, the method comprising:

providing a computing system comprising a computer processing device and a non-transitory computer readable medium, where the computer readable medium comprises configured computer program instruction code, such that when said instruction code is operated by said computer processing device, said computer processing device performs the following operations:

generating a resource disbursement limiter with programmed logic code that is directed to a presentation location within a third party mobile application, wherein the programmed logic code is triggered for integration into the third party mobile application based on location of a mobile device of a user that includes the third party mobile application;

applying a merchant exclusion rule and a user exclusion rule to the resource disbursement limiter to determine authorized transmittal of the resource disbursement limiter, wherein the user exclusion excludes resource disbursement limiters that are different from user transaction history;

transmitting the resource disbursement limiter at the third party system for storage and integration into the third party mobile application for the user for integration into the mobile device of the user;

receiving indication of user utilization of the resource disbursement limiter at a merchant location via the third party mobile application, wherein user utilization of the resource disbursement limiter triggers logic code generation of a communication linkage notification of use of the resource disbursement limiter and a product associated with the use; and storing the received indication and compile previously received indications with the user account for additional generation of resource disbursement limiters and tracking of resource disbursement limiters based on the user utilization of the resource disbursement limiter.

18. The computer-implemented method of claim 17, wherein the resource disbursement limiter is an offer for the user to use during a transaction for purchasing a product or service, within the offer is a discount on a resource requirements for purchasing the product or the service.

19. The computer-implemented method of claim 17, further comprising presenting the resource disbursement limiter as an offer to the user via an interface associated with the third party mobile application during a transaction with a merchant, wherein the offer is positioned in a priority position within a list of offers presented to the user via the interface associated with the third party mobile application.

20. The computer-implemented method of claim 17, wherein receiving an indication of user utilization of the resource disbursement limiter at a merchant location further comprises user selection of an offer via a mobile wallet application provided by the third party to complete a transaction at the merchant using the mobile wallet, wherein the indication is transmitted via a communication link from the merchant or a user device associated with the mobile wallet.

* * * * *